Nov. 9, 1965  H. W. GUNBERG  3,216,748
PRESSURE JOINT
Filed Sept. 25, 1963
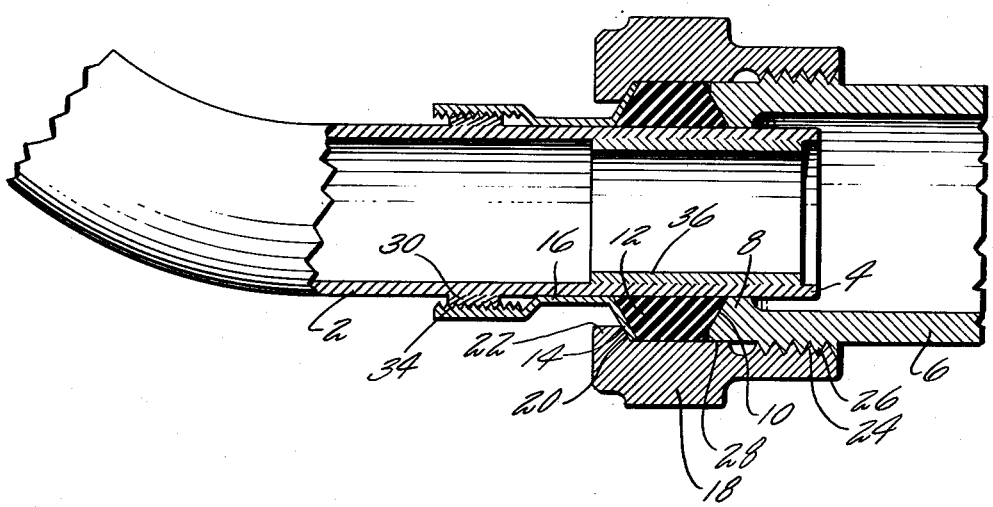
INVENTOR
HARRY W. GUNBERG
BY
ATTORNEY

United States Patent Office 3,216,748
Patented Nov. 9, 1965

3,216,748
PRESSURE JOINT
Harry W. Gunberg, West Hartford, Conn., assignor to United Aircraft Corporation, East Hartford, Conn., a corporation of Delaware
Filed Sept. 25, 1963, Ser. No. 311,530
5 Claims. (Cl. 285—116)

This invention relates to a pressure joint by which a tube may be securely attached to a housing.

One feature of the invention is an arrangement by which to prevent blowout of a tube from a housing as a result of the internal pressure within the tube and housing.

In the attachment between a tube and a fitting by which a tube is held in axial position within the fitting, the tube is generally held in position axially by the clamping action of the packing surrounding the tube at the fitting. Alternatively, the tube end may be flared to assist in the clamping action. Without the flared end, pressure within the tube may be high enough to blow the tube out of the fitting or housing. With the flared end it is impossible to adjust the position of the tube within the fitting or housing to secure a satisfactory attachment. One feature of the invention is a pressure joint having an arrangement for securing the tube positively within the housing and at the same time overcoming the objection to fittings presently available.

Another feature is a pressure joint which will permit adjustment to compensate for a build-up of tolerances in both housing and tube assembly.

Other features and advantages will be apparent from the specification and claims, and from the accompanying drawing which illustrates an embodiment of the invention.

The single figure is a sectional view through an attachment embodying the invention.

In the arrangement shown, the tube 2 has an end 4 fitting within a housing 6, the latter having at its outer end an inwardly projecting flange 8 fitting somewhat closely to the outer surface of the tube. The outer end of the housing terminates in a conical surface 10 which engages with one end surface of packing 12. The other end surface of the packing 12 is conical and engages with a conical flange 14 on a sleeve 16 surrounding the tube. The flange 14 is clamped against the packing by a nut 18 having a conical surface 20 on an inwardly projecting flange 22. This nut is threaded at the end remote from the flange 22 to engage with cooperating threads 26 on the outer surface of the housing 6. A cylindrical surface 28 on the nut engages with the outer cylindrical surface of the housing adjacent the end thereof for piloting the nut during tightening.

The tube has mounted on the outer surface thereof at a point spaced from the end thereof, threaded sleeve 30, the sleeve being brazed or otherwise attached to or integrally a part of the tube. The sleeve 16 is internally threaded as at 34 thereby to provide for adjustment of this sleeve axially along the tube. Between threads 34 and the flange 14 on the sleeve 16 the latter closely fits the outer surface of the tube thereby to prevent extrusion of the packing into the space between the tube and sleeve.

In assembling the device, the packing nut is placed on the tube at a distance such that it will be out of the way of the ring 30 when that is positioned on the tube and suitably attached to the tube. The sleeve 16 is then placed on the tube in threaded engagement with the ring 30. The packing 12 is then placed on the tube, the latter is inserted into the housing to substantially the position shown. For proper adjustment sleeve 16 is turned on its thread to contact packing 12 and the packing nut 18 is then brought into position for engagement with the threads on the housing. It will be understood that the inner diameter of the flange 22 on the packing nut is of larger diameter than the portion of the sleeve 16 carrying the threads in order that the packing nut 18 may be moved freely into assembled position.

With the sleeve 16 in hand-tight engagement with the packing 12 and with the packing 12 in contact with the surface 10, the packing nut 18 is then tightly turned up to secure the parts tightly together and to exert the desired pressure on the packing material. In this way the flange 14 is clamped securely and any movement of the tube in the direction to be withdrawn from the housing is resisted by the sleeve 16. Where heavy clamping action on the packing is anticipated the portion of the tube surrounded by the packing may have a lining sleeve 36 brazed or otherwise attached therein as shown.

It is to be understood that the invention is not limited to the specific embodiment herein illustrated and described but may be used in other ways without departure from its spirit as defined by the following claims.

I claim:

1. In a pressure joint, a tube having an end, a housing receiving and surrounding the end of said tube, said housing having a threaded outer surface, a packing surrounding the tube end and engaging an end surface on the housing, a packing nut surrounding the packing and having threaded engagement with the threads on the housing, said nut having an in-turned flange at the end of the nut remote from the threads for clamping the packing against the end surface of the housing, a threaded ring surrounding and secured to the tube at a point spaced from the tube end and beyond the part of the tube surrounded by the packing and packing nut, and a sleeve surrounding said tube and having threads engaging with the threaded ring, said sleeve extending from the threaded ring toward the end of the tube and having an out-turned flange positioned between and locked by the packing and the in-turned flange of the nut, said sleeve being turnable on the threaded ring to adjust the position of the out-turned flange longitudinally of the tube.

2. A pressure joint as in claim 1, in which the out-turned flange on the sleeve and the in-turned flange on the nut have cooperating conical surfaces.

3. A pressure joint as in claim 1, in which said sleeve has a substantially close fit around the tube between the threaded ring and the flange on the sleeve.

4. A pressure joint as in claim 1, in which the housing has a close fit around the tube adjacent to the packing and a conical end surface to cooperate with a similar surface on the packing.

5. In a pressure joint, a tube having an end, a housing receiving and surrounding the end of the tube, said housing having a threaded outer surface, a packing surrounding the tube end and engaging an end surface on the housing, said housing and the packing having cooperating interengaging conical surfaces thereon, a packing nut surrounding the packing and having threaded engagement with the threads on the housing, a threaded ring surrounding and secured to the tube at a point spaced from the end thereof, a sleeve surrounding the tube and in threaded engagement with the ring, said sleeve being turnable on the tube for adjusting the position of the sleeve longitudinally of the tube, said sleeve extending from the ring toward the end of the tube and having a flange projecting outwardly therefrom for engagement with the end of the packing remote from the housing, said packing nut have an in-turned flange at the end remote from the threads for clamping said flange on the sleeve against the packing and thereby compressing the packing against the tube.

References Cited by the Examiner

UNITED STATES PATENTS

| | | | |
|---|---|---|---|
| 1,746,956 | 2/30 | Metcalf | 285—353 X |
| 2,148,746 | 2/39 | Hampe | 285—332.2 X |
| 2,232,513 | 2/41 | Confer | 285—341 |
| 2,452,278 | 10/48 | Woodling | 285—348 X |
| 2,458,874 | 1/49 | Parker | 285—116 X |
| 2,560,263 | 7/51 | Wiegand et al. | 285—354 X |
| 2,586,950 | 2/52 | Hynes | 285—341 |
| 2,880,019 | 3/59 | Wurtz et al. | 285—353 X |
| 3,058,762 | 9/62 | Howe | 285—354 X |

CARL W. TOMLIN, *Primary Examiner.*